(12) United States Patent
Gaustad

(10) Patent No.: US 10,817,603 B2
(45) Date of Patent: Oct. 27, 2020

(54) COMPUTER SECURITY SYSTEM WITH MALICIOUS SCRIPT DOCUMENT IDENTIFICATION

(71) Applicant: Target Brands, Inc., Minneapolis, MN (US)

(72) Inventor: Evan Gaustad, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 259 days.

(21) Appl. No.: 16/110,766

(22) Filed: Aug. 23, 2018

(65) Prior Publication Data

US 2019/0065744 A1 Feb. 28, 2019

Related U.S. Application Data

(60) Provisional application No. 62/551,532, filed on Aug. 29, 2017.

(51) Int. Cl.
*G06F 21/56* (2013.01)
*G06N 20/00* (2019.01)
*G06F 40/205* (2020.01)

(52) U.S. Cl.
CPC .......... *G06F 21/562* (2013.01); *G06F 40/205* (2020.01); *G06F 2221/033* (2013.01); *G06N 20/00* (2019.01)

(58) Field of Classification Search
CPC .............. G06F 21/562; G06F 40/205; G06F 2221/033; G06N 20/00; G06N 3/08; G06N 5/003
See application file for complete search history.

(56) References Cited

U.S. PATENT DOCUMENTS

| 8,776,231 B2 * | 7/2014 | Moskovitch | .......... G06F 21/562 |
| | | | 726/24 |
| 9,130,988 B2 * | 9/2015 | Seifert | ................ H04L 63/1416 |
| 9,152,694 B1 | 10/2015 | Padidar et al. | |

(Continued)

FOREIGN PATENT DOCUMENTS

| EP | 2182458 | 5/2010 |
| EP | 3139297 | 3/2017 |

OTHER PUBLICATIONS

Jikku and Vinod., "Unknown Metamorphic Malware Detection: Modelling with Fewer Relevant Features and Robust Feature Selection Techniques," *IJCS.*, 42:2, 2015, 13 pages.

(Continued)

*Primary Examiner* — Cheng-Feng Huang
(74) *Attorney, Agent, or Firm* — Fish & Richardson P.C.

(57) ABSTRACT

In some implementations, a method performed by data processing apparatuses includes receiving a new script document in a scripting language that has not yet been classified; identifying features of the new script document, wherein at least some of the features are script-language commands contained in the new script document; generating first feature-data for the new script document, the first feature-data comprising measures of frequency of occurrences of the features within the new script document; and assigning a classification to the new script document based on a comparison of the first feature-data with training data that comprises second feature-data for known-malicious script documents and third feature-data for known-benign script documents.

20 Claims, 10 Drawing Sheets

(56) References Cited

U.S. PATENT DOCUMENTS

| | | | |
|---|---|---|---|
| 9,853,997 B2* | 12/2017 | Canzanese, Jr. | G06F 9/45545 |
| 10,204,221 B2* | 2/2019 | Lu | G06F 21/566 |
| 2004/0148266 A1* | 7/2004 | Forman | G06F 16/353 |
| | | | 706/46 |
| 2006/0037080 A1* | 2/2006 | Maloof | G06F 21/562 |
| | | | 726/24 |
| 2009/0300765 A1 | 12/2009 | Moskovitch et al. | |
| 2012/0079596 A1* | 3/2012 | Thomas | G06F 21/566 |
| | | | 726/24 |
| 2012/0159620 A1 | 6/2012 | Seifert et al. | |
| 2015/0295945 A1 | 10/2015 | Canzanese et al. | |
| 2016/0012220 A1* | 1/2016 | Padidar | H04L 63/105 |
| | | | 726/22 |
| 2016/0352772 A1 | 12/2016 | O'Connor | |

OTHER PUBLICATIONS

Khan et al., "Defending Malicious Script Attacks Using Machine Learning Classifiers," *Wireless Communications and Mobile Computing.*, 2017:5360472, 2017, 9 pages.

* cited by examiner

COMPUTER SECURITY SYSTEM WITH MALICIOUS SCRIPT DOCUMENT IDENTIFICATION

CROSS-REFERENCE TO RELATED APPLICATIONS

This application claims the benefit of U.S. Provisional Application Ser. No. 62/551,532, filed Aug. 29, 2017. The disclosure of the prior application is considered part of (and is incorporated by reference in) the disclosure of this application.

The present document relates to computer network security.

BACKGROUND

Network security includes policies, practices, and devices adopted to prevent and monitor unwanted access, misuse, modification, or attacks on computer networks and network-accessible resources. Script documents are documents containing script language instructions that, when interpreted by a computing system, generally cause the computer system to perform one or more operations. Script languages are programming languages that support scripts: programs that are often written for particular run-time environments to, for example, automate the execution of tasks.

Unlike executables, which are compiled from source code into a machine/binary-level set of encoded instructions that are executed by computer processors (encoded instructions direct specific operations to be performed by the processors), scripting code is generally not compiled and can be interpreted in its human-readable format by other programs (an executable file) that use the instructions contained in the scripting code to direct computer processors to perform operations outlined in the scripting code. Since scripting code generally does not require compilation and can include high-level operations (e.g., a single line of scripting code can perform application or system-level operations), scripting files can be a common way for cyber-attacks to be launched against computing devices and computer systems. For example, scripting code can include malware that, when interpreted by a computing device, causes the computing device to perform one or more operations that may compromise the computing device, information contained on the computing device, and/or other devices/systems/networks to which the computing device is connected.

SUMMARY

This document generally describes computer systems, processes, program products, and devices for thwarting attempts to obfuscate malware within a scripting code. For example, conventional malware detection systems can attempt to identify known malware code by using conventional code and file matching operations (e.g., string matching, matching code/file hashes). However, malware creators can get around such conventional techniques by obfuscating the malware, which can involve, for example, rearranging the sequence operations that are performed, changing variable and function names, and/or other obfuscation techniques. The disclosed technology provides a framework for, among other things, thwarting malware obfuscation attempts by identifying distinct characteristics of known malware attacks that are independent of the specific coding architecture (e.g., specific order of operations, specific variable and function names), and then leveraging those sets of characteristics to determine whether unknown/unverified scripts contain malware. The disclosed technology also provides a framework for generating and using "featureprints" (digital fingerprint for scripting code that includes collection of distinct script features, also referred to as an index) to better group and analyze similar malware attacks across multiple different scripts that, on their face, may appear to be dissimilar (e.g., scripts obfuscated in different ways yet containing the same or similar malware attack).

In some implementations, a method performed by data processing apparatuses includes receiving a new script document in a scripting language that has not yet been classified; identifying features of the new script document, wherein at least some of the features are script-language commands contained in the new script document; generating first feature-data for the new script document, the first feature-data comprising measures of frequency of occurrences of the features within the new script document; and assigning a classification to the new script document based on a comparison of the first feature-data with training data that comprises second feature-data for known-malicious script documents and third feature-data for known-benign script documents.

Implementations can include any, all, or none of the following features. Identifying features of the new script document can include identifying all instances of reserve words specified by a language of the new script document; generating, for each reserve word of the new script document, a count of a number of instances of the reserve word in the new script document. Generating the first feature-data for the new script document can include dividing each count by a total number of reserve words in the new script document. Generating the first feature-data for the new script document can include creating a plurality of metrics that each measure a different feature of the new script document. The method can further include accessing a corpus of known-malicious script documents from a malware reporting service; and generating the second feature-data for known-malicious script documents using the corpus of known-malicious script documents. The method can further include responsive to assigning a classification of malicious to the new script document, performing a corrective action to the new script document. The corrective action can include at least one of the group consisting of deleting the new script document, quarantining the new script document, and transmitting a report about the new script document.

The method can further include generating an index value for the new script document, the index value comprising at least some of the features of the new script document. The index value can include a plurality of the features that have the highest corresponding measures of frequency. The index value can be a string of characters created by concatenating names of a plurality of the features that have the highest corresponding measures of frequency. The method can further include generating first feature scores for each of the features identified in the new script document based on a comparison of the first feature-data with features contained in a corpus of scripting documents in the scripting language. The classification can be assigned to the new script document further based on a comparison of the first feature scores with training data that comprises second feature scores for the known-malicious script documents and third feature scores for the known-benign script documents. The first feature scores can indicate a significance of each of the features relative to both the new script document and the corpus of scripting documents. The features identified in the new script document can include one or more of the following that have been genericized: named variables, named functions, and named parameters. The features identified in the new script document can include one or more functional blocks of code contained in the new script document. The features identified in the new script document can include one or more of the following script-level features in the new script document: a number of lines of code, a number of comments, a number of functions, a number of shell or system-level instructions, and an entropy calculation. The features identified in the new script document can include metadata associated with the new script document including one or more of the following: header information from an email message containing the new script document, metadata from another document containing the new script document, sender information, and recipient information.

In some implementations, a method performed by data processing apparatuses includes receiving a new script document that has not been classified as malicious or benign; identifying features of the new script document, wherein at least some of the features are script-language commands that are present in the new script document; generating first feature-data for the new script document, the first feature-data comprising measures of frequency of occurrences of the features within the new script document; determining a significance-value for each of the features by comparing the first feature-data with training data that comprises second feature-data for known-malicious script documents and third feature-data for known-benign script documents; selecting a proper-subset of the features that have the highest corresponding significance-value; and generating an index value for the new script document, the index value comprising at the selected features.

Implementations can include any, all, or none of the following and/or above-described features. The index value can be a string of characters created by concatenating names of the selected features.

In some implementations, a computer system includes a data processing apparatuses including one or more processors, memory, and a storage device storing instructions that, when executed, cause the one or more processors to perform operations including: receiving a new script document in a scripting language that has not yet been classified; identifying features of the new script document, wherein at least some of the features are script-language commands contained in the new script document; generating first feature-data for the new script document, the first feature-data comprising measures of frequency of occurrences of the features within the new script document; and assigning a classification to the new script document based on a comparison of the first feature-data with training data that comprises second feature-data for known-malicious script documents and third feature-data for known-benign script documents.

The systems, devices, program products, and processes described throughout this document can, in some instances, provide one or more of the following advantages. Computer network security can be improved. For example, malicious scripts can be more accurately and consistently identified, even after the scripts have been subject to obfuscation techniques designed to make malicious identification more difficult. Similar malicious scripts can be advantageously clustered and group, for example, to identify malicious script trends over time. For example, scripts that have been obfuscated can be indexed based on distinct collections of script features that can be consistently identified regardless of obfuscation, which can advantageously allow those scripts to be readily grouped and for associated data (e.g., time/date malicious script detected, source of malicious script, targeted application/system vulnerability) across the group of scripts to be presented to a user. This can provide a variety of advantages, such as to cyber security professionals who may be able to more accurately understand and assess security issues, potential vulnerabilities, and ongoing security threats.

Other features, aspects and potential advantages will be apparent from the accompanying description and figures.

DESCRIPTION OF DRAWINGS

Like reference symbols in the various drawings indicate like elements

DETAILED DESCRIPTION

Figure 1A:
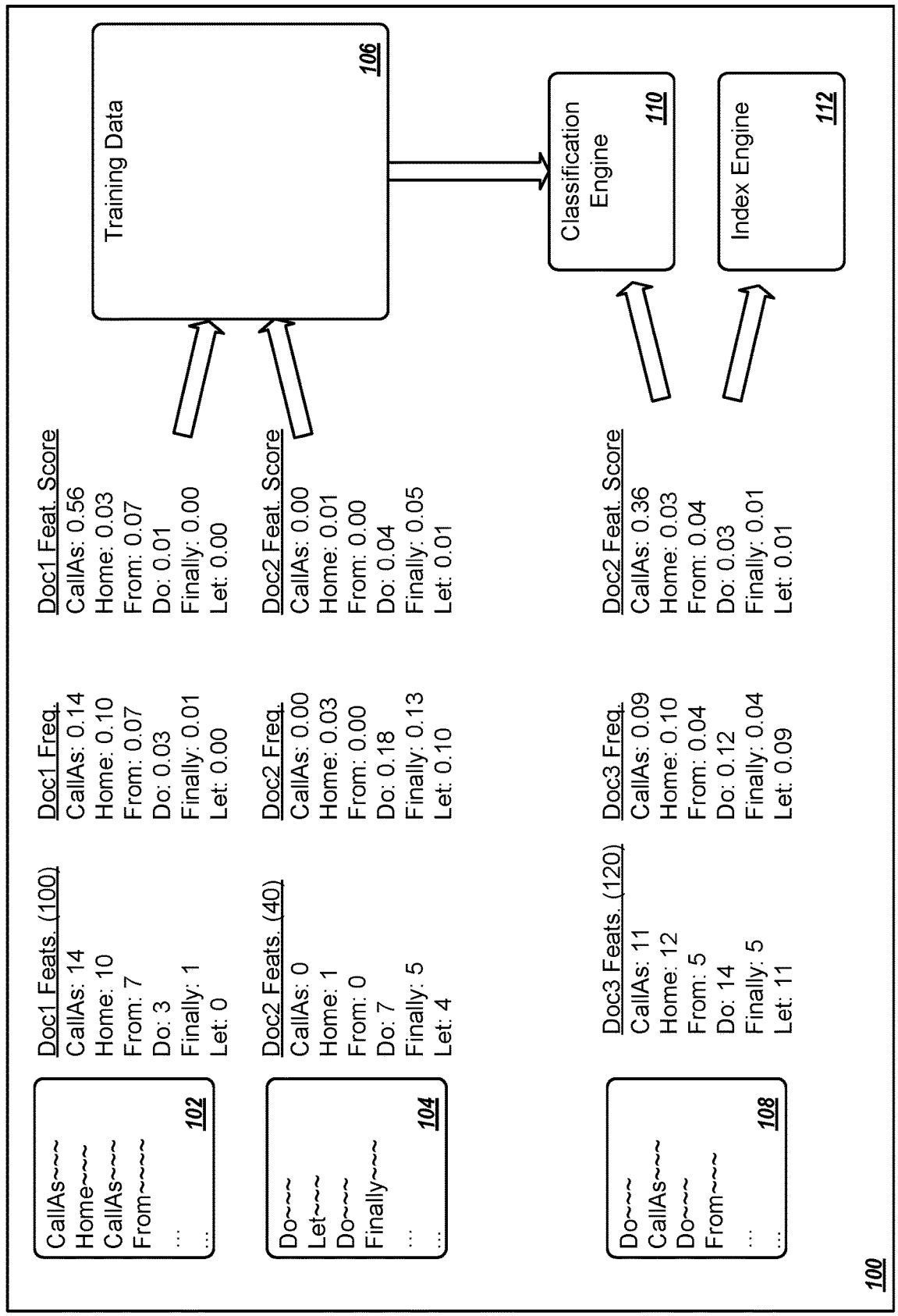
FIG. 1A is a block diagram of data used in the classification and indexing of malicious script documents.

Scripting code can allow a computer user to quickly and easily automate repetitive task such as formatting data or performing repetitive, rote calculations. One example of scripting code are macros used to automate tasks in applications, such as macros written in the VBSCRIPT (VISUAL BASIC SCRIPT) scripting language for the MICROSOFT OFFICE suite (e.g., MS WORD, MS EXCEL). However, the use of scripting code (e.g., scripting documents or files) also presents unique security challenges when they are configured to perform malicious actions. For example, the same script functions that automate creation of an email or the reading of a file to gather information can be used by a malicious attacker to gather and exfiltrate sensitive data.

This document describes technology that characterizes a portion of scripting code into a set of features, then uses a classification engine to determine if those features indicate that the scripting code is more likely to be malicious or benign. Such classification determinations can leverage a corpus of features from known malicious scripting code and known benign scripting code, against which the features from an unknown/unclassified script can be analyzed to determine whether the script is more likely to be benign or malicious. In particular, this technology can work on obfuscated scripts that have been edited to be difficult to read and are thus difficult to understand or identify as malicious. For example, obfuscation techniques may rearrange commands in a script document and may turn user-specified terms into meaningless strings. However, functional elements of the script language (e.g., reserve words and identifiers, genericized function definitions and calls, genericized variable definitions and uses) are maintained through the obfuscation process. As such, this technology can identify features of the script document based on those functional elements.

In addition, this document also describes a scheme for indexing script documents (featureprints) that results in clustering of script documents that are functionally similar even if they have been obfuscated to look different. For example, a dropper malware may be obfuscated a dozen times to make a dozen different-looking script documents. These dozen different-looking script documents can all be analyzed and assigned, due to the fact that they share the same or similar set of functional elements, the same index value (assigned the same featureprint). This index value can be called a "featureprint." Script documents with the same featureprint may then be clustered and data from the clustered group can be analyzed in aggregate, for example, to identify trends, attributes (e.g., script source, script entry point), and other features related to script-based security attacks.

To analyze a new script document, which can be a subset of an entire file (e.g., macro script included in MS Office file) or a file itself (e.g., standalone script file that may be referenced by another file or program), features of the new script document are identified. For example, a script document can be parsed, the reserve words, identifiers, and other functional features of the script language can be identified, and the frequency of each of these features within the document can be determined. This frequency can then be compared with feature-frequencies across a corpus of scripting documents in the scripting language of the new scripting document (e.g., corpus of known-benign and known-malicious scripts in the scripting language) to determine the uniqueness and significance of various features within the new scripting document. The uniqueness and significance of features within the new scripting document can be evaluated against the uniqueness and significance of these same features in known-benign and known-malicious scripts in order to classify the new script document as either benign or malicious.

FIG. 1A is a conceptual diagram of an example system 100 for classifying scripting documents as benign or malicious, and for indexing the scripting documents based on their features. In the depicted example, a known-malicious script document 102 and a known-benign script document 104 are each one document out of a corpus of known-malicious and known-benign script documents. Feature data is identified from the script documents 102 and 104 and added to the corpus of training data 106. Later, when a new script document 108 is introduced, feature-data of the new script document 108 is generated and provided to a classification engine 110 for classification of the new script document 108 and/or to an indexing engine 112 for generating a feature index (featureprint) for the new script document 108.

The known-malicious script document 102, and other known-malicious script documents in the corpus, include documents that are treated as malicious. For example, a malware reporting service may provide examples of malicious script documents, and possibly other types of documents, that the malware reporting service identifies as malicious. In some cases, the malware reporting service can act as a clearing house of known-malicious documents collected from the victims of cyber-attack, from security researchers that have found examples of malicious documents, and from other sources. The malware reporting service can aggregate these malicious documents for use as described here.

The known-benign script document 104, and other known-benign script document is the corpus of known-benign script documents, include documents that are treated as benign. These include script documents that were created for the completion of a legitimate task such as automating a word processing task, generating form letters, or performing a mathematical calculation. For example, known-benign scripting document can be polled from scripts that were created by trusted individuals, such as employees within an organization, and/or downloaded from other sources, such as search engines (e.g., download scripts using search engine API and evaluate scripts with virus scanning program/service) and/or malware reporting services, which can provide known-benign scripting documents in addition to providing known-malicious scripting documents.

For each of the script documents 102 and 104, which are used to populate the training data 106, features can be identified, frequency data for each of the features identified in the script documents 102 and 104 can be generated, and feature scores for each of these features in the script documents 102 and 104 can be generated. The frequency data can be an indication of how frequently various features occur within each of the documents 102 and 104. The frequency data can be generated based on intra-document feature analysis. The feature scores can be an indication of the significance of the features within the documents 102 and 104 based on the frequency data and the occurrence of features across the corpus of documents in the scripting language. Feature scores can be determined using inter-document feature analysis and can rely upon a representative corpus of documents written in the scripting language to get a sense for distinguishing/significant features in each document. For example, a feature that occurs frequently a document yet it infrequently occurs in other documents written in the scripting language (e.g., does not appear in other documents, does not appear with at least a threshold frequency in other documents) can be assigned a greater feature score indicating that the feature is more significant and distinctive of the document than other features in the document that are more common across the other documents.

The feature data and the feature scores for the documents 102 and 104 can be determined and used for a variety of purposes, such as to determine featureprints (indices) for the documents 102 and 104, and to provide a point of comparison against which unknown scripting documents, like document 108, can be compared to determine whether the unknown scripting document is likely benign or malicious. For instance, an index for each of the documents 102 and 104 can be generated from the N most significant features for each of the documents 102 and 104, where N can be an integer greater than 1 (e.g., N can be 3, 4, 5, 6, 7, 10, 15). For example, an index can be a concatenation of the 3 most significant features from each of the documents 102 and 104, and can be stored as part of the training data 106 to provide for more efficient search, grouping, and analysis related to similar/related scripting documents. Indices can additionally be used, for example, as part of classification of unknown scripting documents. However, the index can be a higher-level approximation of the features included in a document and, as a result, the frequency data and the feature scores can additionally be saved as part of the training data 106, and can additionally be used to classify unknown scripting documents as either being likely benign or malicious.

Frequency data for a document can be determined in any of a variety of ways, such as by identifying the number of instances of a feature relative to a total number of features in the document. For example, in the depicted example the known-malicious script document 102 includes 100 instances of features. Of those 100 features, the script-language reserve word "CallAs" occurs 14 times, for a frequency of 0.14.

Similarly, the feature "Home" is found 10 times for a frequency of 0.10, etc. The same frequency analysis can be performed for document 104, which has 40 features differing frequencies for each of the features than document 102. For example, in this example there are 0 instances of "CallAs" document 104, providing a frequency of 0.00 for that features but there are 7 instances of "Do," for a frequency of 0.18 (different from 3 instances of that same term in document 102, which has a frequency of 0.03).

Feature scoring can be determined using any of a variety of appropriate techniques to determine the significance of feature frequency within a corpus of features in a language, such as term frequency—inverse document frequency (tf-idf) calculation for the features. In general, tf-idf is a numerical statistic that is intended to reflect how significant a word or feature within a document is relative to corpus in the same language as the document. While there are a variety of ways to perform tf-idf, in general the analysis looks at the frequency with which a feature occurs in a document relative to the frequency with which that same feature occurs in a corpus of documents in the same language—with the more frequently a feature occurs in a document and the less frequently it occurs in the corpus indicating that the feature is distinctive/significant to the document. For example, the following example tf-idf equation can be used to determine a feature score:

$$\text{score}(doc_x) = \left(\frac{\text{count}(doc_x)}{\text{count}(doc_{all})}\right) * \log\left(\frac{\text{count}(corpus_{all})}{\text{count}(corpus_x)}\right)$$

where score($doc_x$) is the score for feature x in document doc, count($doc_x$) is the number of instances of the feature x in document doc, count($doc_{all}$) is the number of instances of all features in document doc, count($corpus_{all}$) is the number of documents in the corpus of training data 106, and count($corpus_x$) is the number of documents in the corpus of training data 106 that include at least one instance of the feature x. Using this equation, the more frequently that the feature x occurs in the document doc and the less frequently it occurs in the corpus of documents in the language, the greater the score($doc_x$) will be—meaning the more distinctive the feature is to the document doc and the more significant it is relative to other features within the doc and the other documents in the corpus, more generally. For example, a feature that appears within the script document 102 but occurs infrequently in the training data 106 can be identified as a more significant feature of the script document 102 that distinguishes the script document 102 relative to other script documents (e.g., document 104) written in the same scripting language as the script document 102. In contrast, a feature that appears within the script document 102 and that frequently occurs in the training data 106 can be identified as less significant and less distinguishing for the script document 102 relative to other documents in the training data 106.

Similarly, the relative frequency with which features occur in the scripting document 102 relative to the training data 106 can factor into the distinctiveness and significance of those features. For example, a feature that occurs frequently in the scripting document 102 relative to the frequency with which it occurs in other documents included in the training data 106 (even though the feature may occur in the training data 106 with a greater frequency than other features) can indicate that the feature is significant and that the higher frequency of occurrence is distinctive of the scripting document 102. Although the relative frequency with which features occur within documents is not taken into account in the equation above, the equation above can be modified to take such additional factors into account (e.g., weighting the count of documents with a feature based on the frequency of occurrence with which each feature appears in the document). Other factors can additionally and/or alternatively be used to determine scoring data for each of the features identified for the scripting document 108.

Referring to the example depicted in FIG. 1A, the example feature scores for the documents 102 and 104 are determined using the example equation above and a corpus of 1 million documents with the following breakdown of documents containing example features depicted in FIG. 1A:

TABLE 1

| Feature | Number of Documents Containing the Feature |
|---|---|
| CallAs | 100 |
| Home | 525,000 |
| Frome | 100,000 |
| Do | 600,000 |
| Finally | 450,000 |
| Let | 750,000 |

Using the example equation above, the feature CallAs receives a score of 0.56 for document 102 based on it have a relatively high frequency in document 102 (frequency of 0.14) and a relatively low occurrence across the corpus of documents (occurs in only 100 documents in the corpus)—indicating that the frequency with which the CallAs feature appears in document 102 is significant relative to the other features in the document 102 and the other documents in the corpus. Conversely, the feature Finally receives a low score of 0.00 based on it having a low frequency of occurrence in the document 102 (frequency of 0.01) and a high frequency of occurrence in the corpus (occurs in 450,000 documents in the corpus)—indicating that the Finally feature is less significant in the document 102 relative to other features in the document 102 and the other documents in the corpus. In contrast, the CallAs feature does not appear in the document 104 and ends up with a score of 0.00, but the Finally feature appears 5 times in the document 104 and ends up with a score of 0.05—indicating that the Finally feature in the document 104 is more significant than the CallAs in the document 104.

As described in greater detail below, the scoring data can be used to generate feature indices (featureprints) for each of the documents 102 and 104. The indices can be composed of a combination of the N most significant features (e.g., top 3 features, top 5 features, etc.) in each of the documents 102 and 104, as indicated by the scoring data. For instance, using the top 3 features to create indices for the documents 102 and 104, an example index for document 102 can be CallAs_From_Home and an example index for document 104 can be Finally_Do_Let. In this example index format, the top features are concatenated to each other in descending order of significance, with a delimiter ('_') separating each feature. Other formats are also possible, such as different orders (e.g., ascending significance), different delimiters (e.g., '*', '&', '-'), using codes to represent the features (e.g., numeric codes, hexadecimal codes, alphanumeric codes), and/or other formatting features. As discussed throughout this document, indices can be used in a variety of ways, such as to group and analyze similar scripts, to classify scripts as malicious or benign, and/or other features.

The document features, determined frequency data, determined score data, and determined indices can be added to the training data 106 along with identification of the documents 102 and 104, and indications of whether each of these documents are known-malicious or known-benign script documents. In some instances, the documents 102 and 104 from which the frequency data was generated can also be added to the training data 106. The training data 106 may contain frequency data for a corpus of many known-malicious and many known-benign script documents, and the use of this training data 106 will be described below.

A new script document 108 is encountered and can be processed. For example, the new script document 108 can be included as an email attachment in an email entering a local network. When the email is passed through a security gateway, email server, etc., it may be scanned and processed to determine if it is to be categorized as malicious or benign.

From the new script document 108, features can be identified, frequency data for the features can be generated, scoring data for each of the identified features can be determined, and/or a feature index can be generated, as discussed above with regard to documents 102 and 104. The scoring data can indicate a significance and distinctiveness of the features within the script document 108 relative to features included in the corpus of the training data 106 derived from the known-malicious and benign documents 102 and 104, and can be compared to the scoring data for those documents 102 and 104 to classify the unknown scripting document 108.

A classification engine 110 can use the training data 106 (e.g., document data, document designations as known-benign or known-malicious) and the data for the document 108 (e.g., frequency data, scoring data, and/or feature index) to classify the document 108 as malicious or benign. The classification may not be binary, however, but instead may indicate a likelihood/confidence for whether that the document 108 is malicious or benign. The classification engine 110 can use one or more of various techniques to classify the scripting document 108 as either benign or malicious based on the feature data, scoring data, and/or feature indices from the training data 106 and the document 108, such as machine learning techniques, like clustering techniques, neural networks, regression analysis, decision trees, random forests, and/or other machine learning techniques.

For instance, in the depicted example, the feature CallAs has a relative frequency of 0.09 within the document 108 and a resulting feature score of 0.36, and the feature From has a relative frequency in the document of 0.04 and a resulting feature score of 0.04. Using the scoring data, a feature index (featureprint) for the document 108 can additionally be determined. For instance, using the example format described above for documents 102 and 104, the document 108 can have a featureprint of CallAs From Home, which is the same as the known-malicious document 102. The classification engine 110 can use this data for the document 108 to determine that the features, scores, and index for the document 108 are more similar to the example known-malicious document 102 than the example known-benign document 104, and can accordingly classify the document 108 as malicious (e.g., classify with high confidence score).

An index engine 112 can generate indices for the documents 102 and 104 in the training data 106, and for the document 108 that is being classified. The index engine 112 can use the techniques described above, for example, using the N most significant features in each document based on the scoring data. The feature index for the documents can be used for a variety of purposes, for example, to more accurately group scripts that, on their face, may appear to be dissimilar but which include similar functional encodings that make them relevant to analyze and evaluate together. For example, as described above, malicious code obfuscation can be used to mask the same security exploits, but can make identifying that these obfuscated attacks are effectively the same, recognizing patterns associated with the attacks (e.g., common attack sources, common vulnerabilities, common network entry points), and responding to the attacks challenging. Feature indices provide improved ways to identify, track, and respond to obfuscated security attacks that are the same or similar.

Figure 1B:
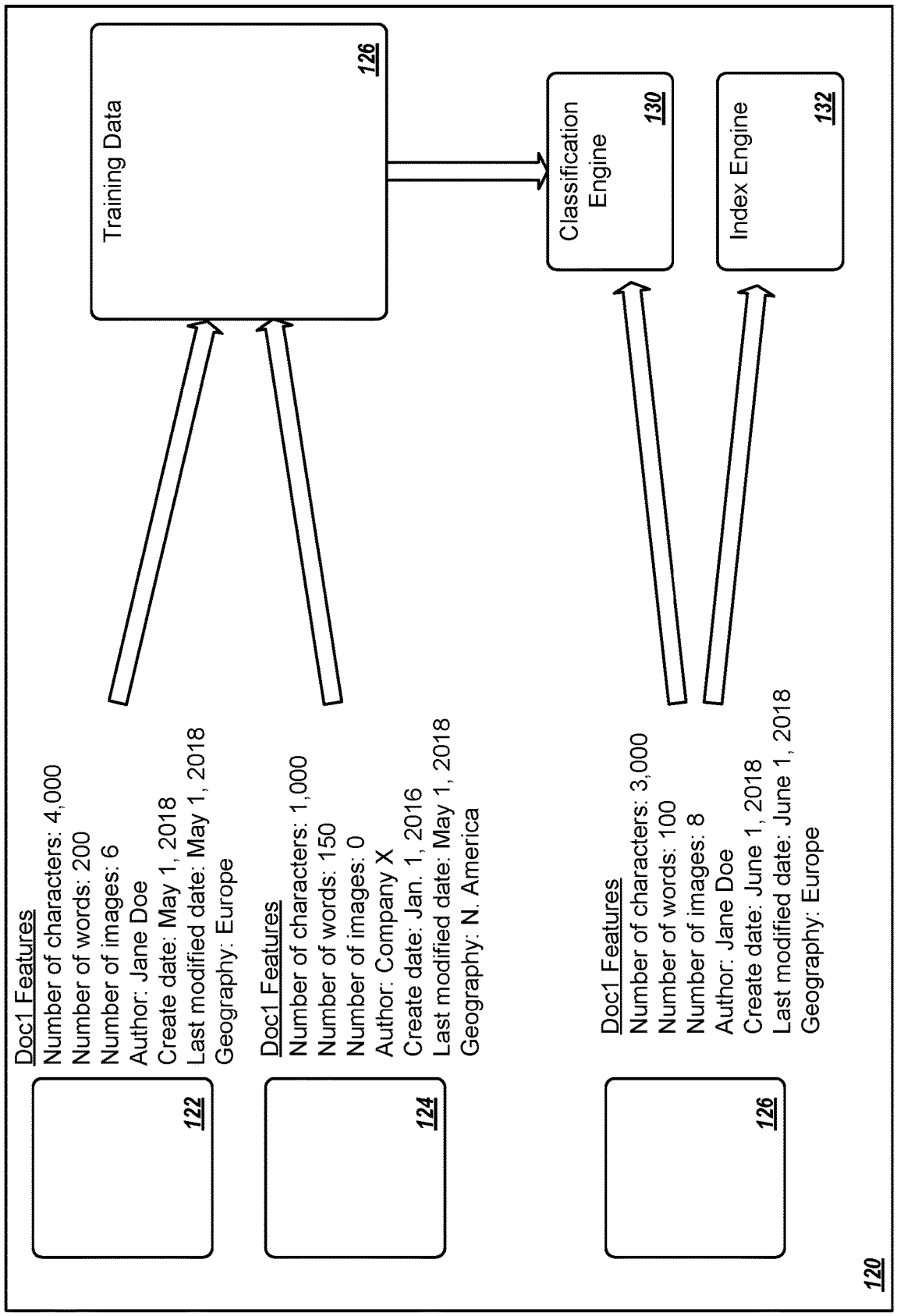
FIG. 1B is a conceptual diagram of an example system for classifying scripting documents as benign or malicious, and for indexing the scripting documents based on their features.

FIG. 1B is a conceptual diagram of an example system 120 for classifying scripting documents as benign or malicious, and for indexing the scripting documents based on their features. The example system 120 is similar to the system 100 described above, but instead of determining script classifications and indices based on the contents of scripts, the example system 100 determines script classifications and indices based on metadata features for scripts. In this example, metadata from known-malicious scripts (e.g., example known-malicious script 122) and metadata from known-benign scripts (e.g., example known-benign script 124) are used to provide a corpus of training data 126 that are used by a classification engine 130 to generate a classification that can be used to classify unknown scripts 126 as either benign or malicious. The system 120 also includes an index engine 132 that can generate a metadata-based featureprint for the scripts, which can be used to readily search, compare, and analyze scripts based on metadata features.

The corpus of training data 126 can be derived from any of a variety of sources, such as the scripts themselves (e.g., scripts 122 and 124) and/or external sources, such devices that have detected the scripts (e.g., network nodes), script aggregating/reporting services (e.g., VIRUSTOTAL), geography location services (e.g., services correlating network addresses, like IP addresses, to geographic locations), and/or other sources that may have additional information not included in the script files themselves. For example, the scripts 122 and 124 can include metadata information, such as the author of the script document, the date the script document was created, the date when the script was last modified, and/or metadata pertaining to the content contained in the script document, such as the number of characters contained in the document, the number of words in the document, the number of images, the number of links in the document, and/or other information. Some metadata for the scripts 122 and 124 may not be contained within the document itself, though, and may instead be supplied by an external source, such as script aggregation service (e.g., VIRUS TOTAL) and/or geography services that correlate a scripts origin to a geographic location.

As depicted in FIG. 1B, example metadata for the known malicious script 122 and the known benign script 124 is shown to illustrate some of the types of metadata fields that may be analyzed and used as part of the training data 126. Different and other fields may additionally and/or alternatively be used. Single metadata fields, by themselves, may not be strong indicators of whether a script is benign or malicious. However, particular combinations of metadata fields and their values can serve as strong indicators of whether a script is benign or malicious. For example, a script that has a created on date and a modified on date that are both on or near the current date—meaning that the script was newly created—can be an indicator that the script is more likely to be malicious. However, there may be some known-good authors (e.g., users, companies, entities) who frequently auto-generate scripts and, as a result, that contain this same pattern but are benign. Using the training data 126, an indicator like this (create and last modified data on or near current date) can be combined with other fields, such as author fields (e.g., document author field) and/or script origination fields (e.g., IP address from which script was delivered, email sender address and/or name for script attached to email, geography fields), to further refine indicators of whether scripts are benign or malicious.

Additional and/or alternative combinations of fields can be used as indicators of whether a script is benign or malicious.

The classification engine 130 can use the training data 126 of known known malicious and known benign scripts to generate one or more classification models that correlate metadata fields to classifications of benign or malicious. The classification models can take metadata fields as input and can provide outputs indicating likelihoods that a script is benign or malicious (e.g., value/score for the script along a range of values that indicates the strength of signal that a script is benign or malicious). For example, scripts can be scored on a range from 0.0 to 1.0, where 0.0 indicates the script is highly-likely to be benign and 1.0 indicates that the script is highly-likely to be malicious. The classification engine can output values along such a range for a script, which can indicate the likelihood that the script is either benign or malicious, and the corresponding confidence in such a determination. For example, a score of 0.1 for an unknown script can indicate that the script is likely to be benign and that there is a fairly high level of confidence associated with that determination (e.g., confidence score for benign scripts can be based on, for example, a normalized value of the score along a range of values indicating a script is benign, such as confidence score=script score/0.5). A score of 0.6 for an unknown script, in contrast, can indicate that the script is likely to be malicious and that there is a fairly low level of confidence associated with that determination (e.g., confidence score for malicious scripts can be based on, for example, a normalized value of the score along a range of values indicating a script is malicious, such as confidence score=(script score—0.5)/0.5).

The classification engine 130 can use any of a variety of techniques to generate classification models based on the training data 126 that are then used to determine script scores based on metadata. For example, the classification engine 130 can use one or more machine learning techniques to generate classification models, such as neural networks, clustering, supervised learning techniques, unsupervised learning techniques, and/or other machine learning techniques. The classification engine 130 may generate one or more classification models that are then used to determine script scores for classifying unknown scripts, such as the unknown script 126, as either benign or malicious. For example, the classification engine 130 may have different classification models that are used based on various factors associated with the scripts, such as the type of script (e.g., scripting language used for script, whether script is embedded in a document or linked to from the document), the manner in which it was detected (e.g., email attachment, resource requested by client device from link in another document), author information (e.g., entity associated with the script), and/or other factors. The classification engine 130 can regularly update the classification models, for example, when new training data 126 is available. The classification models can include information that correlates different metadata features (and/or combinations of metadata features) with how strongly they indicate a script is either benign or malicious, which may take into account the frequency with which those metadata features are present in the training data 126 and how strongly correlated those features are with benign or malicious designations.

The classification engine 130 can use the classification models to determine the script score and to classify unknown scripts, such as the script 126. As discussed below and throughout this document, classification of the unknown script 126 as either benign or malicious can be used for a variety of purposes, such as determining whether the block or permit the script 126. In this example, the script 126 may receive a script score that indicates is the script 126 is more likely malicious given that the example metadata features—number of characters, number of words, number of images, author, relative proximity of create, modify, and current dates, and geography—collectively more closely match those of the known malicious script 122 than the known benign script 124.

The system 120 can also include an index engine 132 that can determine a featureprint for the script 126 based on metadata for the script. The metadata-based featureprint for the script 126 may include, for example, one or more portions of the metadata. Metadata features used for the featureprint may include, for instance, approximations of the features, such as ranges of characters within which the script's metadata falls (e.g., 2,000-4,000 character range instead of the precise number 2,000 characters). For example, the featureprint for the script 126 can include a combination of the author name, a range within which the characters in the script 126 fall, and geography. Additional and/or alternative combinations can be used.

Figure 1C:
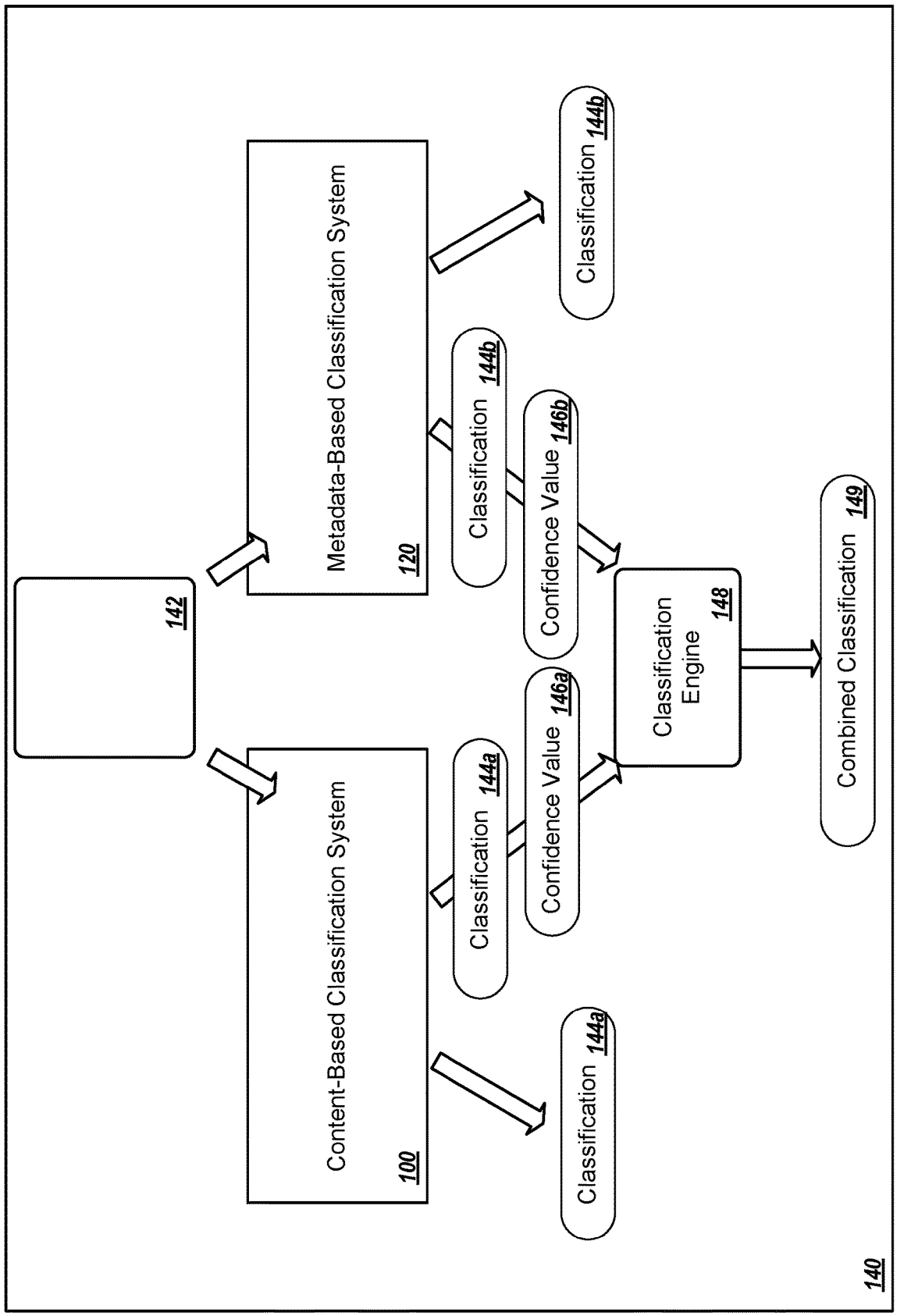
FIG. 1C is a conceptual diagram of an example system for classifying scripting documents as benign or malicious using one or more classification techniques.

FIG. 1C is a conceptual diagram of an example system 140 for classifying scripting documents as benign or malicious using one or more classification techniques. The example system 140 includes the content-based classification system 100 described above with regard to FIG. 1A, the metadata-based classification system 120 described above with regard to FIG. 1B, and a combined classification engine 148 that can select from and/or combine the classifications from the systems 100 and 120. The system 100 and 120 can each be used by themselves to determine document classifications, and/or they can be combined in the system 140 to determine document classifications.

As part of the system 140, an unknown document 142 is provided to both the content-based classification system 100 and the metadata-based classification system 120, which can each have their own training data and classification engines that produce classifications 144a-b for the document 142. As shown, the classification 144a for the content-based classification system 100 can be used by itself and the classification 144b for the metadata-based classification system 120 can be used by itself. Additionally and/or alternatively, these classifications 144a-b can be provided to the combined classification engine 148 in combination with corresponding confidence values 146a-b for each corresponding classification. The confidence values 146a-b can be based on how strongly each of the signals are for the classifications 144a- b. The classification engine 148 can receive and use the classifications 144*a-b* and the confidence values 146*a-b* to determine a combined classification 149 for the script. In some instances, the classification engine 148 may select from among the classifications 144*a-b* based, for example, on the corresponding confidence values 146*a-b* (e.g., select the classification 144*a-b* with the greatest corresponding confidence value). In some instances, the classification engine 148 may only make such a selection when the classifications reach a divergent conclusion (e.g., when one of the classifications 144*a-b* indicates the script is malicious and the other indicates that it is benign). When there is agreement among the classifications 144*a-b* (e.g., when both classifications 144*a-b* indicate that the script is malicious or both indicate it is benign), the combined classification engine 148 can use the consensus classification. In some instances, the classification engine 148 may combine (e.g., average) the classifications 144*a-b* based, for example, using weights that are correlated to the corresponding confidence values 146*a-b* (e.g., weight the classifications 144*a-b* using the confidence values 146*a-b*). Additional and/or alternative techniques for determining the combined classification 149 can be used.

Figure 1D:
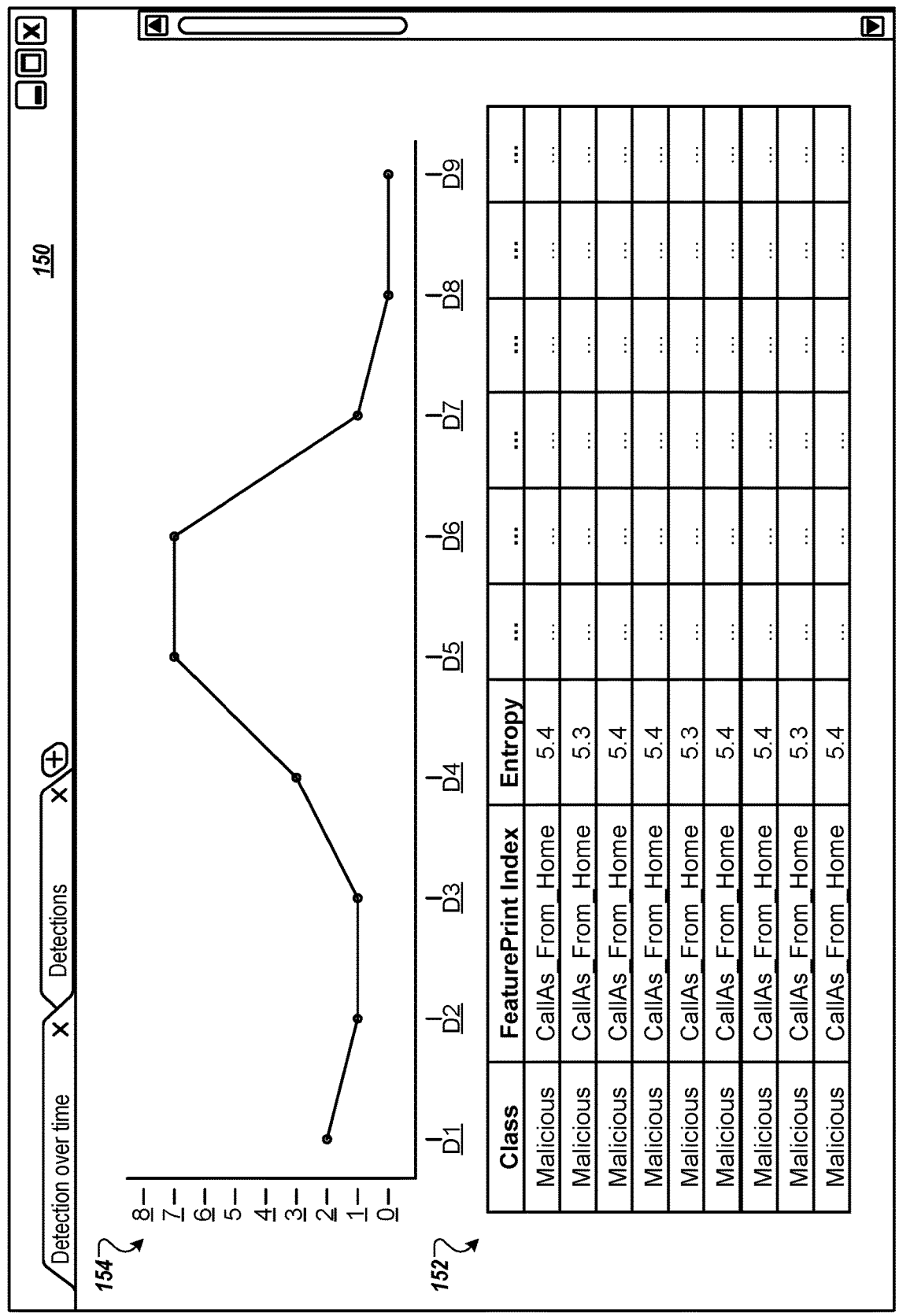
FIG. 1D is a user interface of a computer program for displaying information related to malicious script documents.

FIG. 1D is a user display 150 of a computer program for displaying information related to malicious script documents. The user display 150 may be used, for example, to display some of the data generated by the example system 100, the example system 120, and/or the example system 140 to a user, such as the feature indices (featureprints) described above.

The user display 150 may be used to aggregate information about a group of script documents that all have assigned the same index. This index may be created, for example, from features of script documents that are durable through obfuscation processes. In that way, the user display 150 may be used to present information about different script documents that are related. The user display 150 may be used, for example, as part of a computer application used by a security professional who wishes to learn about security attacks that share common features so that the security professional can analyze similar security attacks, get a more global view of threat campaigns, and more effectively patch security vulnerabilities that are potentially targets of the attack.

The user display 150 can include, for example, a table 152 for presenting information about script documents in textual format. In this example, each row of the table is associated with one script document, and each column is associated with one parameter of the script document. Three parameters are shown, "Class" for classification, "Featureprint Index" for an index, and "Entropy" for an entropy metric. Additional columns are provided and can be used to show other parameters including hash values, dates the document was collected or identified, IP or geolocation information, number of comments included in the code (e.g., count of comments script author included in code), number of lines of code, number of functions per script, ratios of script features (e.g., ratio of number of function to the number of lines of code, other ratios), metadata (e.g., author, date document last modified, data document created, company/organization name, etc.

The user display 150 can include a graph 154 for presenting information about the script documents with the feature index over time in graphical format. Shown is a line-chart that shows discovery of the script documents with the feature index CallAs_From Home (same as documents 102 and 108) in the table 152 over time. As shown, at day D1, two script documents were discovered, at day D2 one more was discovered, etc. Other graph formats are possible, including but not limited to pie-charts, heat maps, geographical maps, etc. Additionally, multiple different indices can be plotted on the same graph over time.

Documents with the same index value are show to allow a user to draw conclusions from this information. For example, as the index is created from features with high inverse document frequency value compared to other script documents, the user is able to understand that documents shown are functionally similar and may be created from the same base script, or may be written by the same author. Values that are repeated for many rows may indicate that the same author repeated some action when generating each document. For example, if every document includes instructions to download a file from the same IP address or domain, the user may investigate the registration data for that address in an effort to learn about the author or user of the malicious script.

Figure 2A:
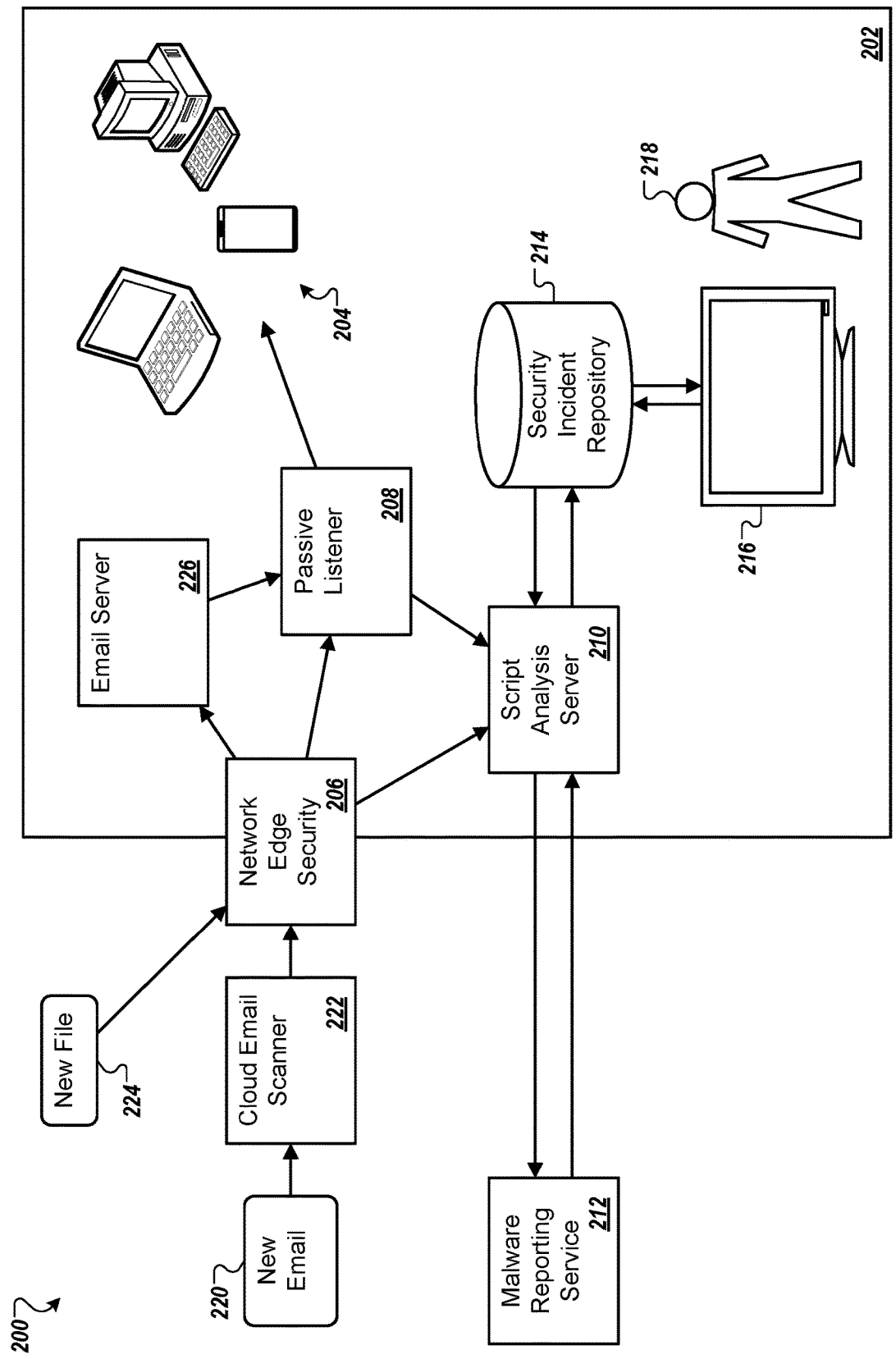
FIG. 2A is a block diagram of a system used in the classification and indexing of malicious script documents.

FIG. 2A is a block diagram of an example system 200 used in the classification and indexing of malicious script documents. In this example, the administrator of a network 202 is using on-site script analysis system to identify malicious script documents on the network 202. It will be understood that different networking arrangements can be made, including moving some or all of the elements off the protected network.

The network 202 allows for electronic communication among computing clients 204 on the network 202 and with networks outside the network 202 (e.g., the Internet). The network 202 can include elements including, but not limited to, wireless and/or wired access points, file and/or application servers, routers, and network cables.

Communications into and out of the network 202 can be routed through a network edge security device 206. The network edge security device 206 can operate as a router, modem, and/or firewall, etc. in order to secure the network 202 and allow data to pass into and out of the network 202.

A passive listener 208 can passively listen to data traffic on the network 202 in order to provide information about the data traffic. For example, a script analysis server 210 may collect information from the passive listener 208 and/or the network edge security device 206 in order to analyze script documents that are in transit, entering, or exiting the network 202. The script analysis engine 210 is also in communication with a malware reporting service 212 that is configured to provide information about malware that has been found in other systems, for example on a subscription basis. For example, the all email attachments inbound to a network can be parsed out and analyzed by the script analysis engine 210, which could be done anywhere email traffic and attachments are visible to network sensors. While all emails can be analyzed, the script analysis engine 210 can be particularly focused on analyzing emails that make it through other preventative controls (e.g., network firewalls, virus scanning services) and are cleared to be delivered to end user mailboxes. Emails and attachments that are blocked by preventative controls can, however, still be analyzed to obtain threat intelligence information, such as information about who is attacking an organization and their intended target.

Information generated by the script analysis server 210 can be stored in a security incident repository 214. For example, the security incident repository 214 can comprise a database to store structured data generated by the script analysis server. This information can include metadata about malicious script documents, a copy of the malicious script documents, features identified from the malicious script documents, and/or feature scores for the malicious script documents, as described above with regard to FIGS. 1A-C. In some cases, one or more indexes may be constructed on this data, as also described above with regard to FIGS. 1A-B. An index may include, for example, the N (e.g., 3) most significant features of the malicious script document, and/or may include a combination of metadata-based features.

A reporting display 216 can be used to show a user information that is stored in the security incident repository 214. For example, the reporting display 216 can generate the user display 150.

Data moving on, into, and out of the network 202 can be analyzed to identify malicious script documents. For example, a new email may be sent to a user of one of the clients 204. The new email 220 can be routed through a cloud email scanner that can perform security scans on the new email 220. For example, the cloud email scanner may perform a signature-based scan of the new email 220 and any attachments to the new email 220. The email can next pass through the network edge security device 206 and be routed to the email server 226. While traveling to the client 204, the new email 220 may additionally or alternatively be parsed by the passive listener 208. The cloud email scanner 222, network edge security device 206, and/or the passive listener 208 can examine the new email 220 to determine if it contains an attachment that is a script document (e.g., a word processing document with a script-based macro, a webpage with a script object). If a script document is found, the script document can be forwarded to the script analysis server 210 for analysis and possibly documentation in the security incident repository. Similarly, a new file 224 may come into the network 202 via the network edge security device 206 and be reported to the script analysis server 210 by either the network edge security device 206 and/or the passive listener 208.

Figure 2B:
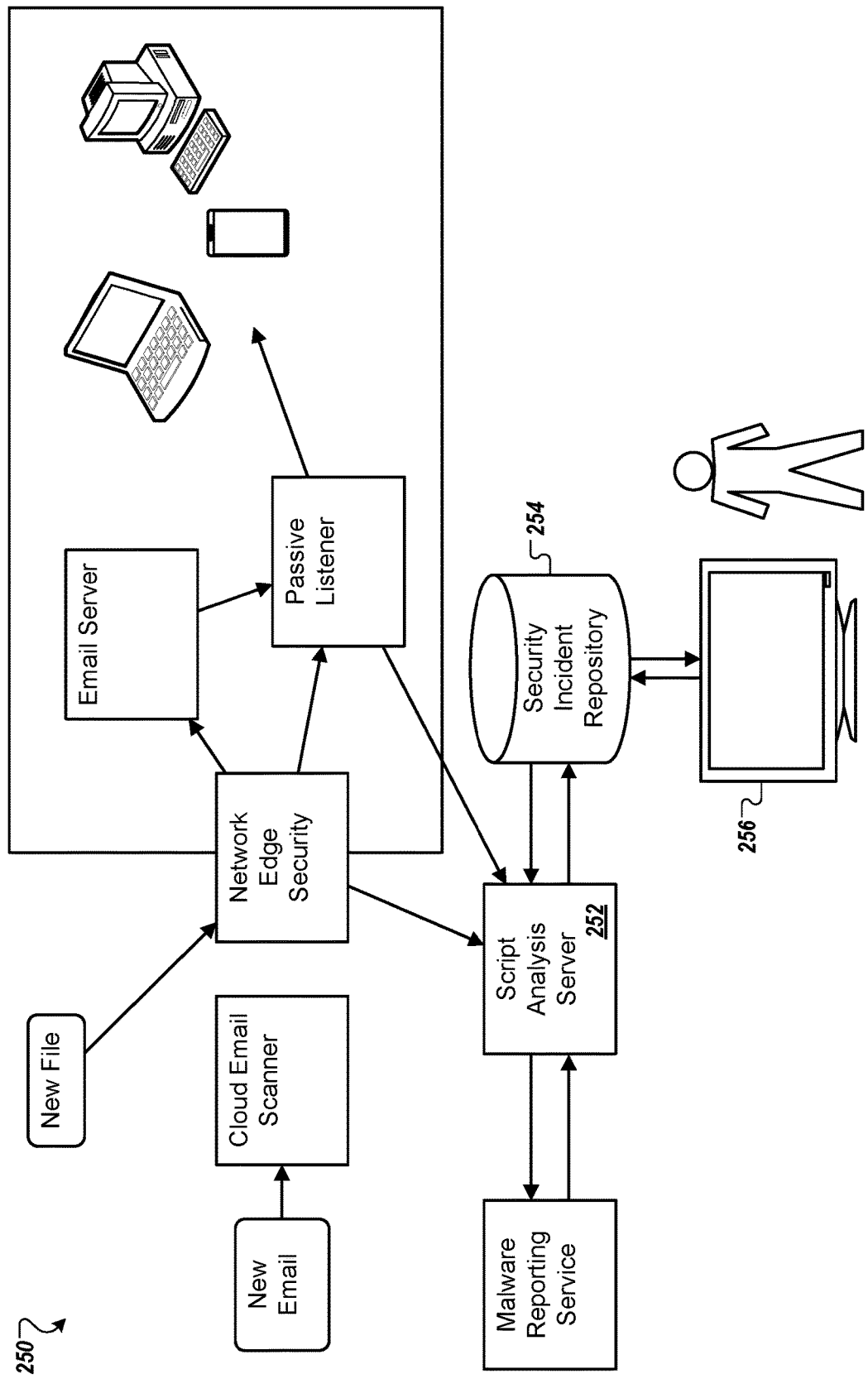
FIG. 2B is a block diagram of a system used in the classification and indexing of malicious script documents.

FIG. 2B is a block diagram of a system 250 used in the classification and indexing of malicious script documents. In the system 250, which is similar to the system 200 except for the script analysis, repository, and reporting are moved offsite to an offsite script analysis server 252, security incident repository 254, and reporting display 256 are used. For example, these features may be provided as "cloud services" by service providers, and may be provided without providing particular details about their implementation. In other examples, a network may be protected by a mix of on-site and cloud services. Regardless of whether onsite, offsite, or a combination thereof, script evaluation and analysis can be performed using the techniques described throughout this document, such as those described above with regard to FIGS. 1A-C.

Figure 3:
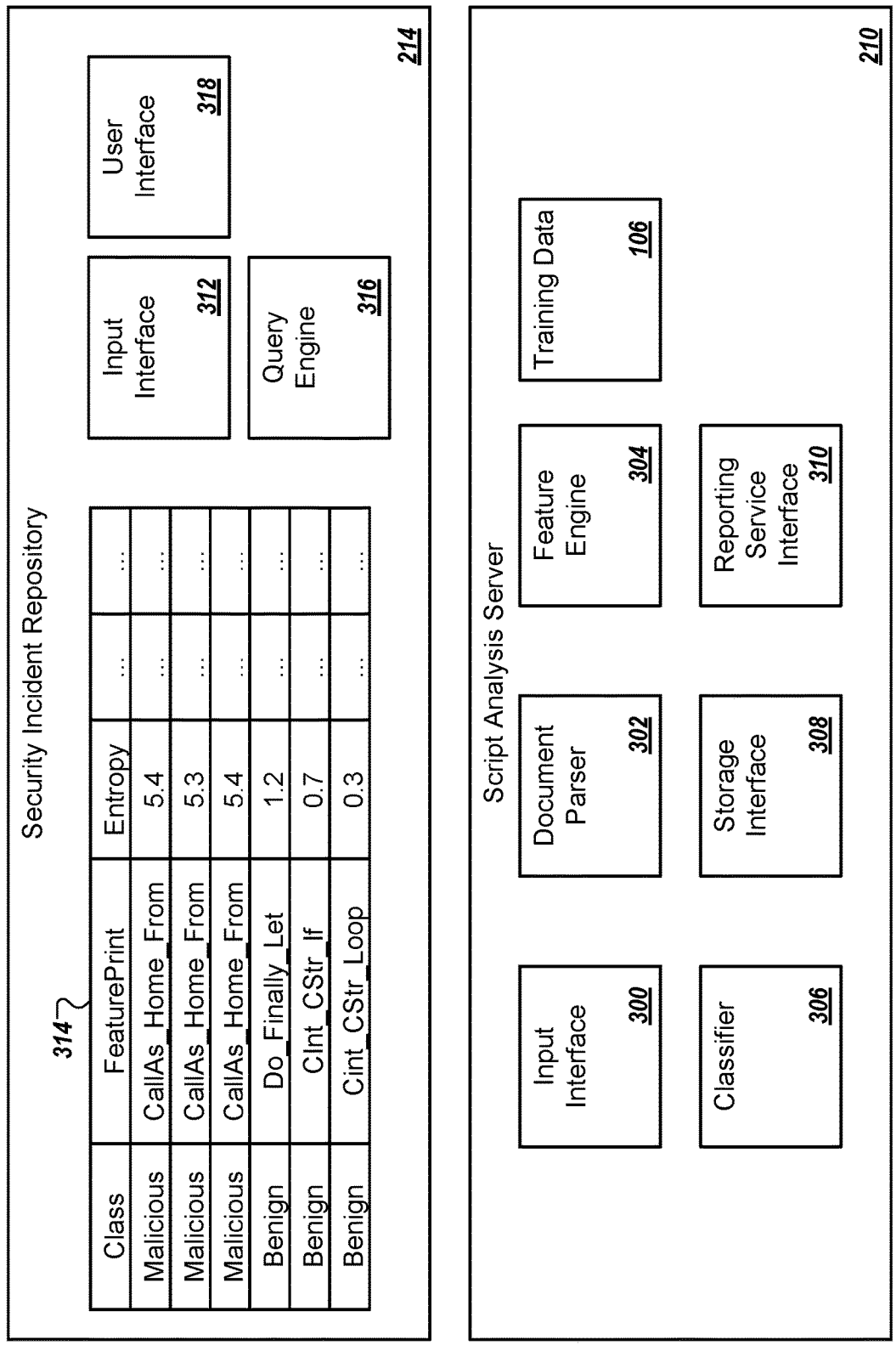
FIG. 3 is a block diagram of a system used in the classification and indexing of malicious script documents.

FIG. 3 shows the elements of the script analysis server 210 and the security incident repository 214 in greater detail.

The script analysis server 210 can include an input interface 300. The input interface 300 can include hardware and/or software to receive input from the network 202, including but not limited to a network card, network card driver, and software elements for receiving script documents that were discovered by the cloud email scanner 222, network edge security device 206, and/or passive listener 208. For example, the input interface 300 may include a service to listen on a particular port number for incoming messages such as remote procedure calls (RPSs) or HTTP messages that include a script document.

The script analysis server 210 can include a document parser 302. The document parser 302 can access new script documents from the input interface 300 and parse the new script document into a parsed document. For example, the new script document may be a Virtual Basic for Applications (VBA) or Javascript document, and the document parser 302 can run the script through a VBA or Javascript parser, as appropriate, to generate a structured document such as a JavaScript Object Notation (JSON) or eXtensible Markup Language (XML) document. In some cases, the document parser 302 may have parsers for different script languages, and the document parser may examine the script document to determine a language in which the script is written. In response, the document parser 302 may select a corresponding parse engine and use the selected parse engine to parse the new script document.

The script analysis server 210 can include a feature engine 304. The feature engine 304 can access the parsed document from the document parser 302 in order to identify features of the new script documents and generate feature-data for the new script document. For example, the feature engine 304 can step through the structure of the parsed document to identify script-language commands contained in the new script documents (e.g., reserved command words and characters in the scripting language), functional blocks of scripting code (e.g., functions defined in the script), genericized portions of code in the script (e.g., genericizing named features in the script, such as function and variable names), non-functional code features (e.g., number of comments per line of code), script document-level features (e.g., number of lines of code, number of comments, number of functions, number of shell instructions), entropy calculations for the scripting code, and/or other features of the scripting code. Additionally and/or alternatively, features can include other data and information associated with the script document (but not included in the script document itself), such as header information contained in an email or other messaging service via which the script was transported (e.g., sender email address, sender IP address, server originating messaging traffic, country of origin, mismatch between the sending domain and the sender email address), metadata associated with the script (e.g., metadata for .doc file containing macro script, such as author identity, date/time of last edit), and/or other associated information. Other features can additionally and/or alternatively be identified, including information about the document contents (e.g., how many characters are in the document itself, whether there images included in the document, whether characters are identified in the image using, for example, optical character recognition, whether the document is configured to prompt the user to "enable macros" (which can cause the user to manually initiate an attack), and/or others), and/or profiling information about the sender and recipient, including any previous correspondence between the sender and recipient (e.g., evaluate whether the recipient is receiving an email "out of the blue" from a sender that happens to have an attachment). The feature engine 304 can identify features included in the scripting documents without interpreting, compiling, or otherwise running the scripts, as opposed to such steps that are taken in static and dynamic code analysis.

In addition to identifying features included in scripting documents, the feature engine 304 can determine feature data for the identified features and determine feature scores for the identified features, as described above, for example, with regard to FIGS. 1A-C. For instance, the feature engine 304 can determine the frequency of each feature within a scripting document by counting the number of instances of each feature of the document and dividing that number by the total number of all features identified for the scripting document. These features can include, for example, not only the reserved-word features contained in the scripting documents but additional features identified in the scripting documents, as noted in the preceding paragraph. In another example, the feature engine 304 can determine features scores indicating a significance for each of these features within scripting documents relative to a corpus of scripting documents included in the training data 106. Feature scores can be determined using any of a variety of technique, such as tf-idf and/or other techniques, as described above, for example, with regard to FIGS. 1A-C. In another example, feature scores for each of the features can be determined by comparing the frequency of each feature with frequencies of historical training data. The difference between these frequencies—that is how often the feature shows up in the new script document compared to a corpus of other script documents—can be used to create the significance-value.

The feature engine 304 can also be configured to construct one or more index values for the new script document. For example, the feature engine 304 can select N (e.g., 3) features and concatenate those features together to generate an index value that is sometimes called a 'featureprint.' To select the N features, the feature engine 304 can select the N most significant features, as indicated by the feature scores.

The script analysis server 210 can include a classifier 306. The classifier 306 can classify a new script document as, for example, benign or malicious. To make this classification, the classifier 306 can compare the feature data, score data, and/or index value of the new script document with training data and assign a classification to the new script document. The classifier may use a test that, generally speaking, determines if the feature-data (e.g., frequencies of the different features), feature scores (e.g., significance of the features), and/or index (e.g., featureprint) of the new script document is more like the feature-based characteristics of known-benign or known-malicious data. To make this classification, the classifier 306 may use a statistical classification such as decision trees, random forest, a neural network, a linear classifier, a support vector machine, a kernel estimation, etc. For example, random forest can be effective across most use cases in that it can tolerate a large number of features, it can generally provide quick and efficient predictions, and it generally does not need a significantly large amount of training data to be effective. Other statistical classification techniques can also be used.

The script analysis server 210 can include a storage interface 308. The storage interface 308 can include hardware and/or software to transmit data to the security incident repository 214, including but not limited to a network card network card driver, and software elements for transmitting the new script document and/or related information to the security incident repository 214.

The script analysis server 210 can include a reporting service interface 310. The reporting service interface 310 can include hardware and/or software to transmit data to the reporting service 212 including but not limited to a network card network card driver, and software elements for transmitting the new script document and/or related information to the malware reporting service 212, and for receiving information about known-benign and/or known-malicious script documents.

The security incident repository 214 can include an input interface 312. The input interface 312 can include hardware and/or software to receive input from the script analysis server 210, including but not limited to a network card, network card driver, and software elements for receiving script documents and related data that was analyzed by the script analysis server 210. For example, the input interface 312 may include a service to listen on a particular port number for incoming messages such as RPCs or HTTP messages that include a script document and feature-data.

The security incident repository 214 can include a security incident database 314 to store script documents and feature-data. For example, the security incident database 314 can include a relational or non-relations, scalable database that stores data in tables or another structure that is conduce to indexing, searching, and querying. The security incident database 314 can include information including, but not limited to, script documents and corresponding indexes, analysis data, frequency-data, feature scores, and/or other data. For example, the security incident database 314 can include information about files detected on an organization's network as well as information from external virus monitoring services (e.g., VIRUSTOTAL, HYBRID-ANALYSIS, other publicly available services both for free or paid). Such internal and external file sources can be combined as part of the analysis, such as leveraging file information (e.g., featureprints, timestamps, other file information) for both internal and external files to search the database and draw correlations between activity that is being detected internally within an organization and broader attack campaigns targeting other organizations (as represented by the external file sources). The information stored in the incident database 314 from external documents can include, for example, a timestamp for the date observed, hash, filename(s), antivirus scan information, file metadata like author, date file created, file size, copy of the extracted macros, in addition to the fields generated by the script analysis server 210, such as featureprint/index, predictions (e.g., malicious or benign script), entropy, and/or others. The information stored in the incident database 314 from internal documents can be the same as for external documents, but can also include delivery information, such as information identifying senders, recipients, email subject, email header metadata, and/or other email/script delivery information. This delivery information can be analyzed to determine a variety of details regarding attacks, such as whether an attacker is targeting a specific group of people, and the external data can be analyzed to determine whether other organizations are or were experiencing the same attacks, using the featureprints (indices) to draw correlations between the internal and external data.

The security incident repository 214 can include a query engine 316. The query engine can receive or generate queries to run against the security incident database 314. For example, the query may be request entries from the data from the security incident database 314 that all match some search criteria (e.g., a field matching "CallAs_Home_From"). The query engine can, for example, examine the security incident database 314 and select all records that contain meet the search criteria, and return those records as a result.

The security incident repository 214 can include a user interface 318. The user interface 318 can include hardware and/or software to receive input and provide output to one or more users, including but not limited to a network card, network card driver, and software elements for input and output. For example, the user interface 318 may generate a graphical user interface in the form of a webpage, application interface, or application program interface (API). One example user interface that may be created is user display 150, although other interfaces are possible.

Figure 4:
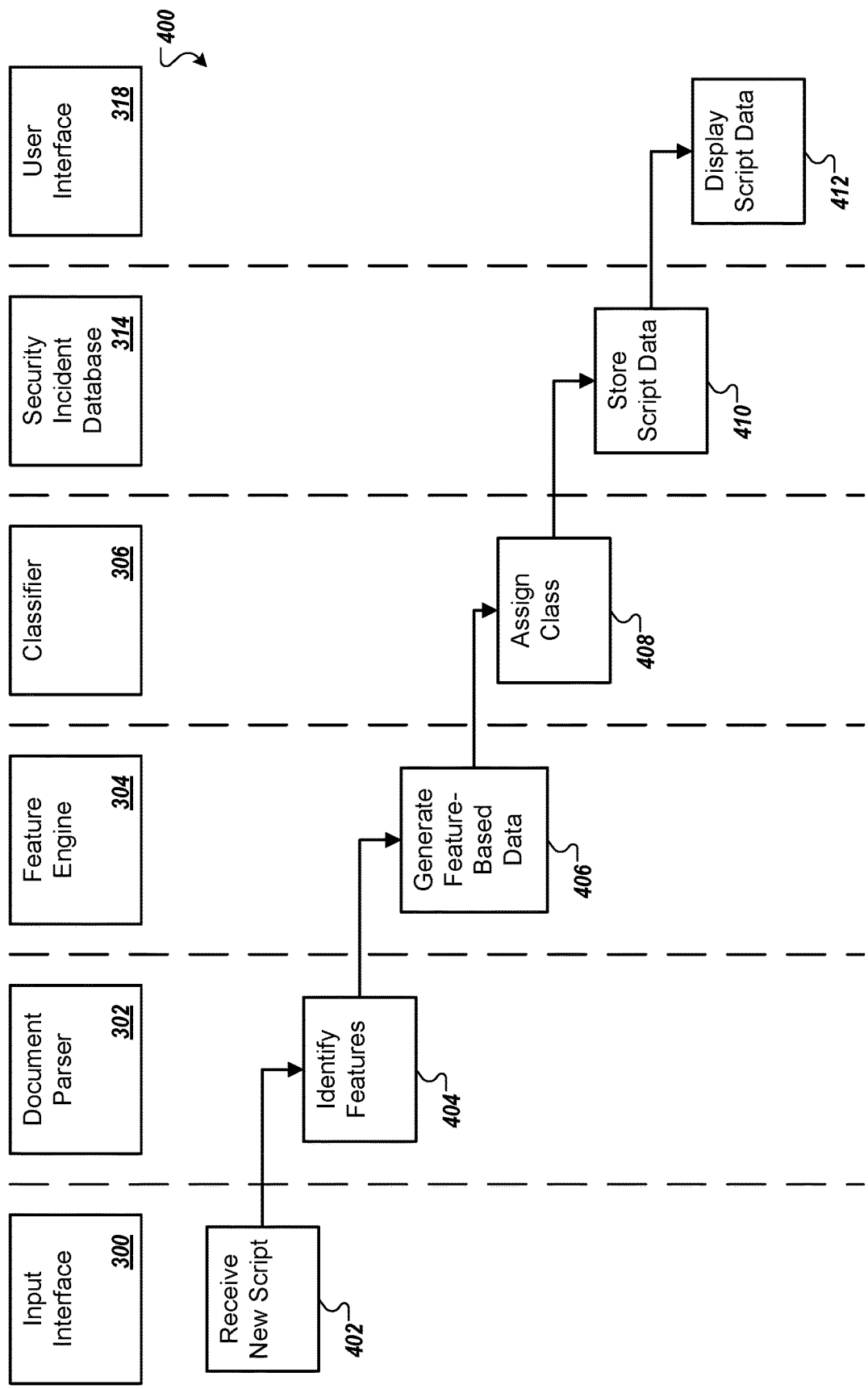
FIG. 4 is a swimlane diagram of a process for classifying script documents.

FIG. 4 is a swimlane diagram of an example process 400 for classifying script documents. The process 400 can be performed by, for example, elements of the system 200, and will be described with reference to FIGS. 2A and 3. However, other systems may be used to perform the same or a similar process.

A new script document that has not yet been classified is received 402. For example, a user of one of the clients 204 can access the new email 220 from the email server 226. While in transit, the passive listener 208 can identify the new email 220 on the network 202 and determine that the new email contains an attachment.

Unbeknownst to the user, the attachment contains a malicious VBA that is configured to download a keylogger on the client device 204. However, before the attachment can reach the user, the passive listener 208 can send the attachment to the script analysis server 210.

Features of the new script document are identified 404. For example, upon receipt, the document parser 302 can parse the VBA script portion of the new script document into an XML that represents the VBA script in the form of a syntax tree. Then, once parsed, features of the script are identified, counted, calculated, and/or otherwise analyzed, as described above with regard to FIGS. 1A-C and the feature engine 304 in FIG. 3. For example, each reserve word of the VBA language may be considered as its own feature, and thus a count of each reserve word in the XML representation may be made. Other forms of features may be measures made of the VBA script or XML representation. For example, a measure of entropy or code complexity may be made and used as a feature. In another example, script-level features (e.g., the number of comments, the number of lines of code, the number of functions, the number of shell and/or system-level instructions), functional features (e.g., functions defined in scripts), metadata (e.g., email header information, .doc metadata), genericized script features (e.g., genericized function names, parameters, variables), and/or other features can be identified.

Feature-based data (e.g., feature data, feature scores, featureprints/indices) for the new script document are generated 406. With the features of the new script document identified by the document parser 302, the feature engine 304 can generate feature-based data that, generally speaking provides a measure for the significance or relative frequency of features, as compared with other script documents. For example, the feature engine 304 can determine the frequency data and feature score as described above with regard to FIGS. 1A-C and 3. The feature engine 304 can also generate one or more indexes for the new script document, as will be described below in process 500.

A classification is assigned to the new script document 408. For example, the classifier 306 can compare the feature-based data for the new VBA script against training data 106, which contains feature-based data for known-malicious script documents and feature-based data for known-benign script documents. The classifier 306 can be configured to use one or more statistical classifiers to programmatically determine if the new VBA script is, based on the feature-based data, more like the known-malicious or the known-benign scripts recorded in the training data 106. In this case, as the new VBA script is a dropper (a well-known type of malware), the classifier 306 classifies the new VBA script as malicious. Advantageously, the classification can be made even after the VBA script has been obfuscated.

Responsive to the malicious classification, one or more elements of the system 200 can automatically take a corrective action on the new email 220 and/or the attachment containing the malicious script. For example, the network edge security device, passive listener 208, or the client 204 can be configured to receive a notification from the script analysis server 210 with instructions to take the corrective action. In general, corrective actions are actions that can be taken by a computing device to reduce the risk of malicious scripts, to alert a user to the presence of a malicious script, or to otherwise maintain the integrity and security of the network 202 and elements of the system 200. Examples of corrective actions include, but are not limited to, deleting the new script document, quarantining the new script document, and transmitting a report about the new script document. For example, the email server 226 may quarantine the email 220, the passive listener 208 may drop the new email 220 from the network, and the script analysis server 210 may send an instant message to a client 204 used by the user 218, who may be a network administrator for the network 202.

Script data is stored 410. For example, information about the VBA script may be added to the security incident database 314 so that it may be aggregated with information about other malicious scripts. The security incident database 314 may add the malicious script and/or a listing of relevant features, feature-based data, index values, metadata, timestamp data, and other data for future display to the user.

Script data is displayed 412. For example, after receiving the instant message, the user 218 may wish to learn about the malicious script that was detected.

The user interface 318 can generate the user display 150, which can display information about the malicious VBA script, along with information about other malicious scripts that have the same index value.

Figure 5:
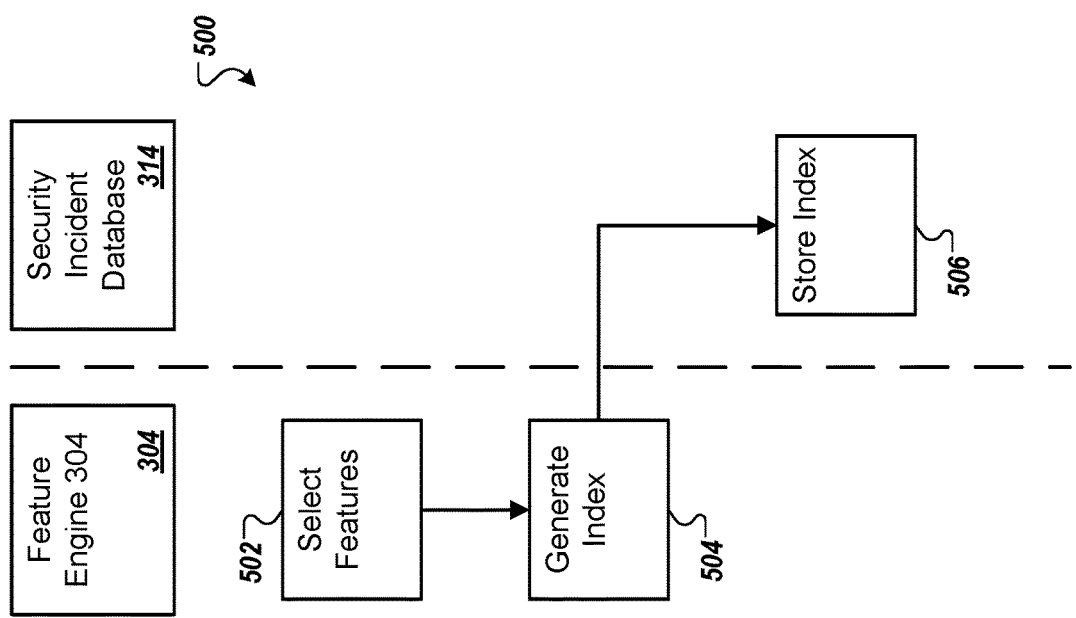
FIG. 5 is a swimlane diagram of a process for indexing script documents.

FIG. 5 is a swimlane diagram of an example process 500 for generating script document indices. The process 500 can be performed by, for example, elements of the system 200, and will be described with reference to FIGS. 2A and 3. However, other systems may be used to perform the same or a similar process.

A proper-subset of the features are selected that have the highest corresponding significance as indicated by feature scores 502. For example, the feature engine 304 can be presented with a new script document that was attached to the new email 220. In response, the feature engine 304 can generate an index value for the new script document. In some cases, the feature engine 304 can generate the index value in response to some determination, such as a determination that the new script document is categorized as malicious.

In order to generate the index value, the feature engine 304 can select, from the group of all features of the new script document, a subset of the features that have the highest corresponding significance based on the determined feature scores. As described above, the corresponding feature scores can be a measure of the significance or occurrences of the feature in the new script document relative to a corpus of documents in the scripting language.

The feature engine 304 can sort the features according to the corresponding feature scores. In such a sorting, the features having the highest corresponding feature scores can be placed at the beginning of the list. Then, the feature engine 304 can select the N (e.g., 3) features at the beginning of the list. As a result, the feature engine 304 can select the N features having the highest corresponding feature score.

An index value is generated for the new script document using the selected features 504. For example, the index engine 304 can create the index value by concatenating the N features into a single string. For example, the features "CallAs," "Home," and "From," can be concatenated into the index value "CallAsHomeFrom." In some cases, special characters can be used, for example to delineate the features in the index value. For example, the same three features can be concatenated into the index value "CallAs_Home_From." The features may be ordered according to one or more particular ordering schemes. For example, the features may be ordered in the index value by their feature-value. In some examples, the features may be ordered in alphabetical order, which can result in an index value such as "CallAs_From_Home."

The index value is stored 506. For example, the security incident database 314 can store the index value in a data record with or linked to the script from which the index value is created. This stored index value can then be used, for example, to cluster scripts together, as shown in the user display 150.

Figure 6:
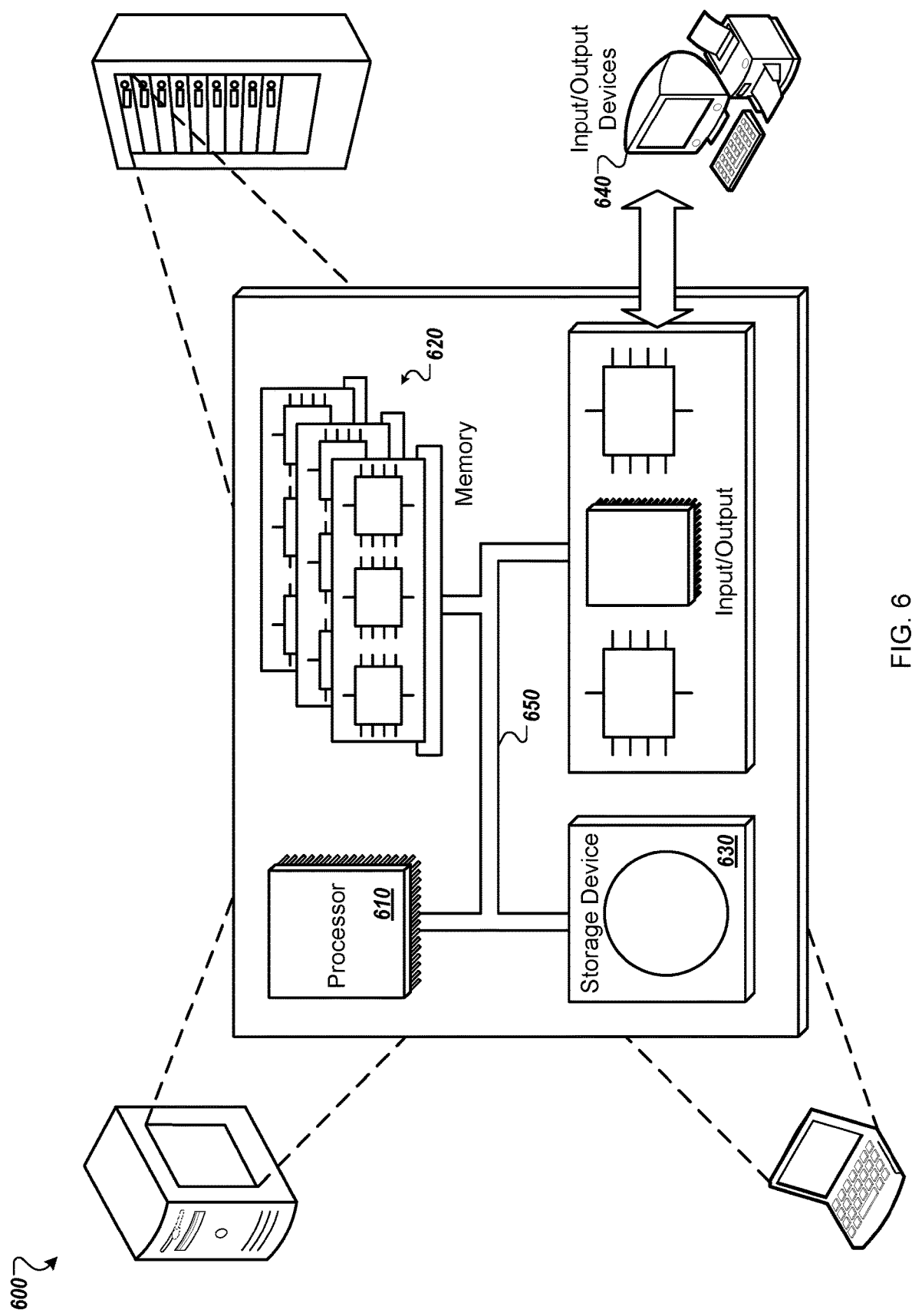
FIG. 6 is a schematic diagram that shows an example of a computing device and a mobile computing device.

FIG. 6 is a schematic diagram that shows an example of a computing system 600. The computing system 600 can be used for some or all of the operations described previously, according to some implementations. The computing system 600 includes a processor 610, a memory 620, a storage device 630, and an input/output device 640. Each of the processor 610, the memory 620, the storage device 630, and the input/output device 640 are interconnected using a system bus 650. The processor 610 is capable of processing instructions for execution within the computing system 600. In some implementations, the processor 610 is a single-threaded processor. In some implementations, the processor 610 is a multi-threaded processor. The processor 610 is capable of processing instructions stored in the memory 620 or on the storage device 630 to display graphical information for a user interface on the input/output device 640.

The memory 620 stores information within the computing system 600. In some implementations, the memory 620 is a computer-readable medium. In some implementations, the memory 620 is a volatile memory unit. In some implementations, the memory 620 is a non-volatile memory unit.

The storage device 630 is capable of providing mass storage for the computing system 600. In some implementations, the storage device 630 is a computer-readable medium. In various different implementations, the storage device 630 may be a floppy disk device, a hard disk device, an optical disk device, or a tape device.

The input/output device 640 provides input/output operations for the computing system 600. In some implementations, the input/output device 640 includes a keyboard and/or pointing device. In some implementations, the input/output device 640 includes a display unit for displaying graphical user interfaces.

Some features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM (erasable programmable read-only memory), EEPROM (electrically erasable programmable read-only memory), and flash memory devices; magnetic disks such as internal hard disks and removable disks; magneto-optical disks; and CD-ROM (compact disc read-only memory) and DVD-ROM (digital versatile disc read-only memory) disks. The processor and the memory can be supplemented by, or incorporated in, ASICs (application-specific integrated circuits).

To provide for interaction with a user, some features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

Some features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN (local area network), a WAN (wide area network), and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

What is claimed is:

1. A method for classifying unknown scripts as either benign or malicious performed by data processing apparatuses, the method comprising:
receiving a new script document in a scripting language that has not yet been classified;
identifying features of the new script document, wherein at least some of the features are script-language commands contained in the new script document, wherein identifying features of the new script document comprises: identifying all instances of reserve words specified by a language of the new script document; and
generating, for each reserve word of the new script document, a count of a number of instances of the reserve word in the new script document;
generating first feature-data for the new script document, the first feature data comprising measures of frequency of occurrences of the features within the new script document, wherein generating the first feature-data for the new script document comprises dividing each count by a total number of reserve words in the new script document;
assigning a classification to the new script document based on a comparison of the first feature-data with training data that comprises second feature-data for known-malicious script documents and third feature-data for known-benign script documents; and
responsive to assigning a classification of malicious to the new script document, performing a corrective action to the new script document, wherein the corrective action comprises at least one of the group consisting of deleting the new script document, quarantining the new script document, and transmitting a report about the new script document.

2. The method of claim 1, wherein generating the first feature-data for the new script document comprises creating a plurality of metrics that each measure a different feature of the new script document.

3. The method of claim 1, the method further comprising:
accessing a corpus of known-malicious script documents from a malware reporting service; and
generating the second feature-data for known-malicious script documents using the corpus of known-malicious script documents.

4. The method of claim 1, the method further comprising:
generating an index value for the new script document, the index value comprising at least some of the features of the new script document.

5. The method of claim 4, wherein the index value comprises a plurality of the features that have the highest corresponding measures of frequency.

6. The method of claim 4, wherein the index value is a string of characters created by concatenating names of a plurality of the features that have the highest corresponding measures of frequency.

7. The method of claim 1, further comprising:
generating first feature scores for each of the features identified in the new script document based on a comparison of the first feature-data with features contained in a corpus of scripting documents in the scripting language,
wherein the classification is assigned to the new script document further based on a comparison of the first feature scores with training data that comprises second feature scores for the known-malicious script documents and third feature scores for the known-benign script documents.

8. The method of claim 7, wherein the first feature scores indicate a significance of each of the features relative to both the new script document and the corpus of scripting documents.

9. The method of claim 1, wherein the features identified in the new script document include one or more of the following that have been genericized: named variables, named functions, and named parameters.

10. The method of claim 1, wherein the features identified in the new script document include one or more functional blocks of code contained in the new script document.

11. The method of claim 1, wherein the features identified in the new script document include one or more of the following script-level features in the new script document: a number of lines of code, a number of comments, a number of functions, a number of shell or system-level instructions, and an entropy calculation.

12. The method of claim 1, wherein the features identified in the new script document include metadata associated with the new script document including one or more of the following: header information from an email message containing the new script document, metadata from another document containing the new script document, sender information, recipient information.

13. The method of claim 1, further comprising:
identifying metadata features of the new script document,
accessing a metadata classification model that is generated based on training data including metadata from the known-benign script documents and the known-malicious script document;
assigning a metadata-based classification to the new script document based on a comparison of the metadata features with the metadata classification model; and
determining a combined classification for the new script document based on the classification and the metadata-based classification.

14. The method of claim 13; wherein the combined classification is determined based on corresponding confidence scores for the classification and the metadata-based classification.

15. The method of claim 1, wherein the corrective action comprises deleting the new script document.

16. The method of claim 1, wherein the corrective action comprises quarantining the new script document.

17. The method of claim 1, wherein the corrective action comprises transmitting the report about the new script document.

18. A method for classifying unknown scripts as either benign or malicious performed by data processing apparatuses, the method comprising:
receiving a new script document that has not been classified as malicious or benign;
identifying features of the new script document, wherein at least some of the features are script-language commands that are present in the new script document, wherein identifying features of the new script document comprises:
identifying all instances of reserve words specified by a language of the new script document; and generating, for each reserve word of the new script document, a count of a number of instances of the reserve word in the new script document;
generating first feature-data for the new script document, the first feature data comprising measures of frequency of occurrences of the features within the new script document, wherein generating the first feature-data for the new script document comprises dividing each count by a total number of reserve words in the new script document;
determining a significance-value for each of the features by comparing the first feature-data with training data that comprises second feature-data for known malicious script documents and third feature-data for known-benign script documents;
selecting a proper-subset of the features that have the highest corresponding significance-value;
generating an index value for the new script document, the index value comprising the selected features; and providing a search interface configured to permit searching and identification of different scripts using similar malware attacks based on the index value.

19. The method of claim 18, wherein the index value is a string of characters created by concatenating names of the selected features.

20. A computer system for classifying unknown scripts as either benign or malicious comprising:
- a data processing apparatuses including one or more processors, memory, and a storage device storing instructions that, when executed, cause the one or more processors to perform operations comprising:
  - receiving a new script document in a scripting language that has not yet been classified;
  - identifying features of the new script document, wherein at least some of the features are script-language commands contained in the new script document, wherein identifying features of the new script document comprises:
- identifying all instances of reserve words specified by a language of the new script document; and generating, for each reserve word of the new script document, a count of a number of instances of the reserve word in the new script document;
- generating first feature-data for the new script document, the first feature-data comprising measures of frequency of occurrences of the features within the new script document, wherein generating the first feature-data for the new script document comprises dividing each count by a total number of reserve words in the new script document;
- assigning a classification to the new script document based on a comparison of the first feature-data with training data that comprises second feature-data for known-malicious script documents and third feature-data for known-benign script documents; and
- responsive to assigning a classification of malicious to the new script document, performing a corrective action to the new script document, wherein the corrective action comprises at least one of the group consisting of deleting the new script document, quarantining the new script document, and transmitting a report about the new script document.

* * * * *